US012613726B2

(12) United States Patent
Das

(10) Patent No.: US 12,613,726 B2
(45) Date of Patent: Apr. 28, 2026

(54) DYNAMICALLY ENABLING ADVANCED PROGRAMMABLE INTERRUPT CONTROLLER VIRTUALIZATION CAPABILITIES FOR VIRTUAL MACHINES

(71) Applicant: RED HAT, INC., Raleigh, NC (US)

(72) Inventor: Bandan Das, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 695 days.

(21) Appl. No.: 18/173,498

(22) Filed: Feb. 23, 2023

(65) Prior Publication Data

US 2024/0289152 A1     Aug. 29, 2024

(51) Int. Cl.
 *G06F 9/455*      (2018.01)
 *G06F 9/48*       (2006.01)

(52) U.S. Cl.
 CPC ........ G06F 9/45558 (2013.01); G06F 9/4812 (2013.01); *G06F 2009/45575* (2013.01)

(58) Field of Classification Search
 CPC .............. G06F 9/45558; G06F 9/4812; G06F 2009/45575; G06F 2009/45579
 See application file for complete search history.

(56) References Cited

U.S. PATENT DOCUMENTS

| | | | |
|---|---|---|---|
| 9,116,869 B2 * | 8/2015 | Madukkarumukumana | ................ G06F 13/24 |
| 10,884,782 B1 | 1/2021 | Naenko et al. | |
| 11,144,419 B2 | 10/2021 | Das et al. | |
| 11,222,082 B2 | 1/2022 | Komarov | |
| 11,281,607 B2 | 3/2022 | Das | |
| 2011/0197004 A1 * | 8/2011 | Serebrin | ............. G06F 9/45558 710/267 |

(Continued)

FOREIGN PATENT DOCUMENTS

| | | | |
|---|---|---|---|
| CN | 101127045 A | * | 2/2008 |
| CN | 107797895 A | | 3/2018 |
| CN | 108701046 A | | 4/2022 |

OTHER PUBLICATIONS

Anonymous, "Red Hat Enterprise Linux 6.4 Technical Notes," Red Hat, Inc., retrieved Nov. 24, 2022: pp. 1-795, <https://access.redhat.com/documentation/en-us/red_hat_enterprise_linux/6/html-single/6.4_technical_notes/index>.

*Primary Examiner* — April Y Blair
*Assistant Examiner* — Zhi Chen
(74) *Attorney, Agent, or Firm* — Kilpatrick Townsend & Stockton LLP

(57) ABSTRACT

Advanced programmable interrupt controller (APIC) virtualization capabilities can be dynamically enabled for virtual machines (VMs). In one example, a VM executing in a computing device can determine that an interrupt request executed by a particular virtual central processing unit (vCPU) for the VM will involve a virtualization exit. The vCPUs allocated to the VM can be mapped to processors in entries of an APIC table for an APIC virtualization. In response, the virtual machine can access a shared page including a copy of the APIC table and a maximum entry number for the APIC table. The virtual machine can determine that an identification number of a particular processor mapped to the particular vCPU in the copy of the APIC table is less than the maximum entry number. In response, the computing device can execute an interrupt procedure for the interrupt request using the APIC virtualization without triggering the virtualization exit.

20 Claims, 3 Drawing Sheets

(56)          References Cited

U.S. PATENT DOCUMENTS

2019/0253743 A1*  8/2019  Tanaka ................. H04N 21/812
2021/0326163 A1   10/2021  Gopalan
2022/0365802 A1*  11/2022  Neiger .................... G06F 13/24

* cited by examiner

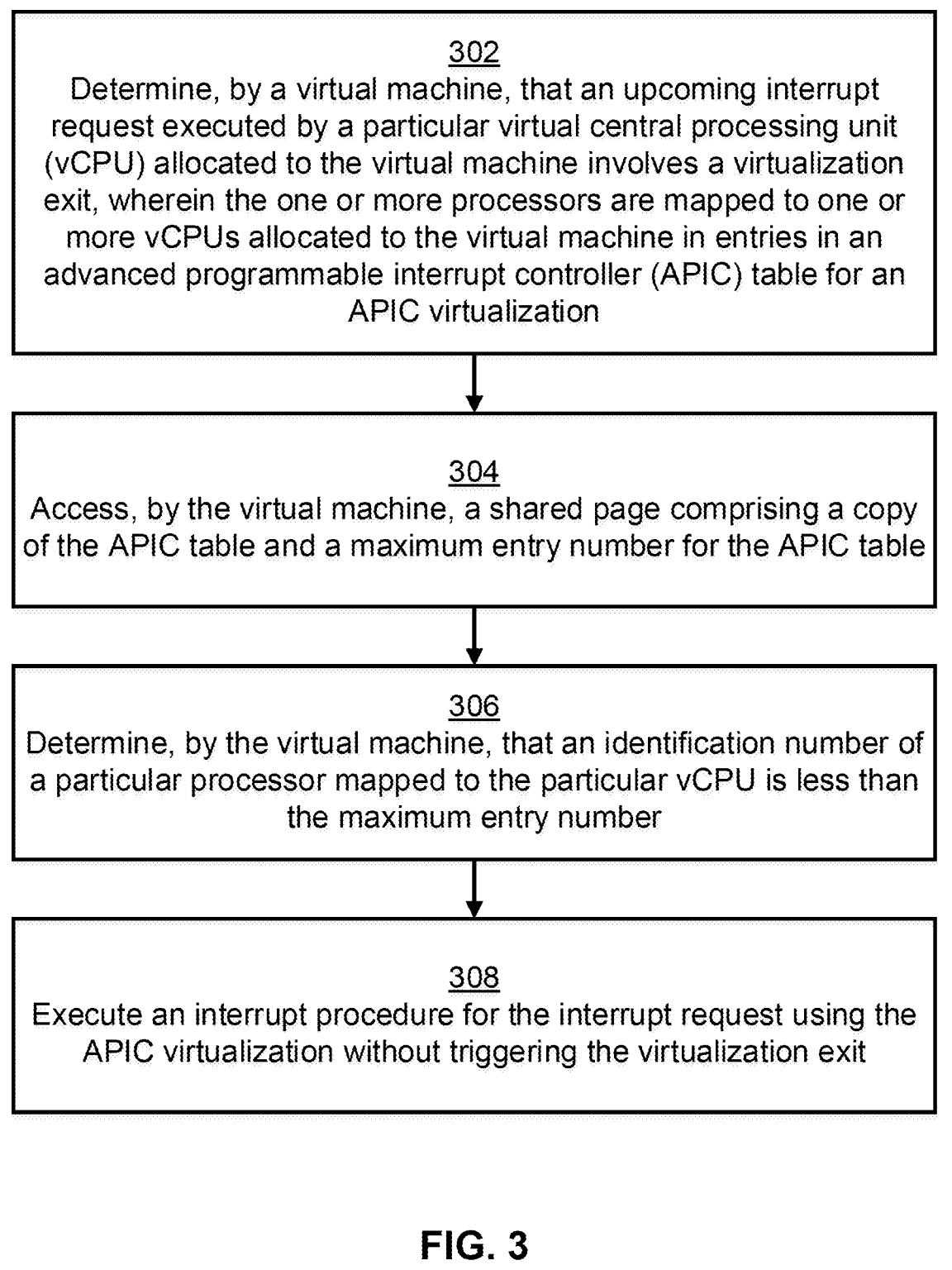

302
Determine, by a virtual machine, that an upcoming interrupt request executed by a particular virtual central processing unit (vCPU) allocated to the virtual machine involves a virtualization exit, wherein the one or more processors are mapped to one or more vCPUs allocated to the virtual machine in entries in an advanced programmable interrupt controller (APIC) table for an APIC virtualization 304
Access, by the virtual machine, a shared page comprising a copy of the APIC table and a maximum entry number for the APIC table 306
Determine, by the virtual machine, that an identification number of a particular processor mapped to the particular vCPU is less than the maximum entry number 308
Execute an interrupt procedure for the interrupt request using the APIC virtualization without triggering the virtualization exit

FIG. 3

DYNAMICALLY ENABLING ADVANCED PROGRAMMABLE INTERRUPT CONTROLLER VIRTUALIZATION CAPABILITIES FOR VIRTUAL MACHINES

TECHNICAL FIELD

The present disclosure relates generally to virtual machines and, more particularly (although not necessarily exclusively), to dynamically enabling advanced programmable interrupt controller (APIC) virtualization capabilities for virtual machines.

BACKGROUND

Virtual machines are one popular mechanism for deploying virtual computing environments on a physical computer system. A virtual machine (VM) typically includes virtualized hardware and guest software. The virtualized hardware can emulate physical computer hardware. Examples of the virtualized hardware can include virtual central processing units (vCPUs), virtual random access memory (vRAM), virtual network interfaces, and virtual storage. The guest software can be any software programs that execute on top of the virtual machine. Examples of the guest software can include a guest operating system, a guest supervisory program, and one or more guest applications that may execute in userspace. Guest software is generally given limited access to the physical resources of the underlying host machine.

Virtual machines can be deployed on a host machine using a hypervisor. A hypervisor can be a software layer that sits below the virtual machines and above the physical hardware of the host machine. In some cases, the hypervisor can execute on top of an operating system running on the host machine. In other cases, the hypervisor can execute directly on the physical hardware without an operating system beneath it. Either way, the hypervisor can provide interfaces between the virtual machines and the underlying physical hardware of the host machine.

Certain events occurring in a virtual machine may result in the generation of signals referred to as interrupts. For example, an interrupt may be triggered in response to the guest software performing a sensitive operation. Examples of such sensitive operations can include the guest software attempting to execute a privileged instruction or attempting to access a certain memory address.

BRIEF DESCRIPTION OF THE DRAWINGS

FIG. 3 is a flowchart of a process for dynamically enabling APIC virtualization capabilities for VMs according to one aspect of the present disclosure.

DETAILED DESCRIPTION

Figure 1:
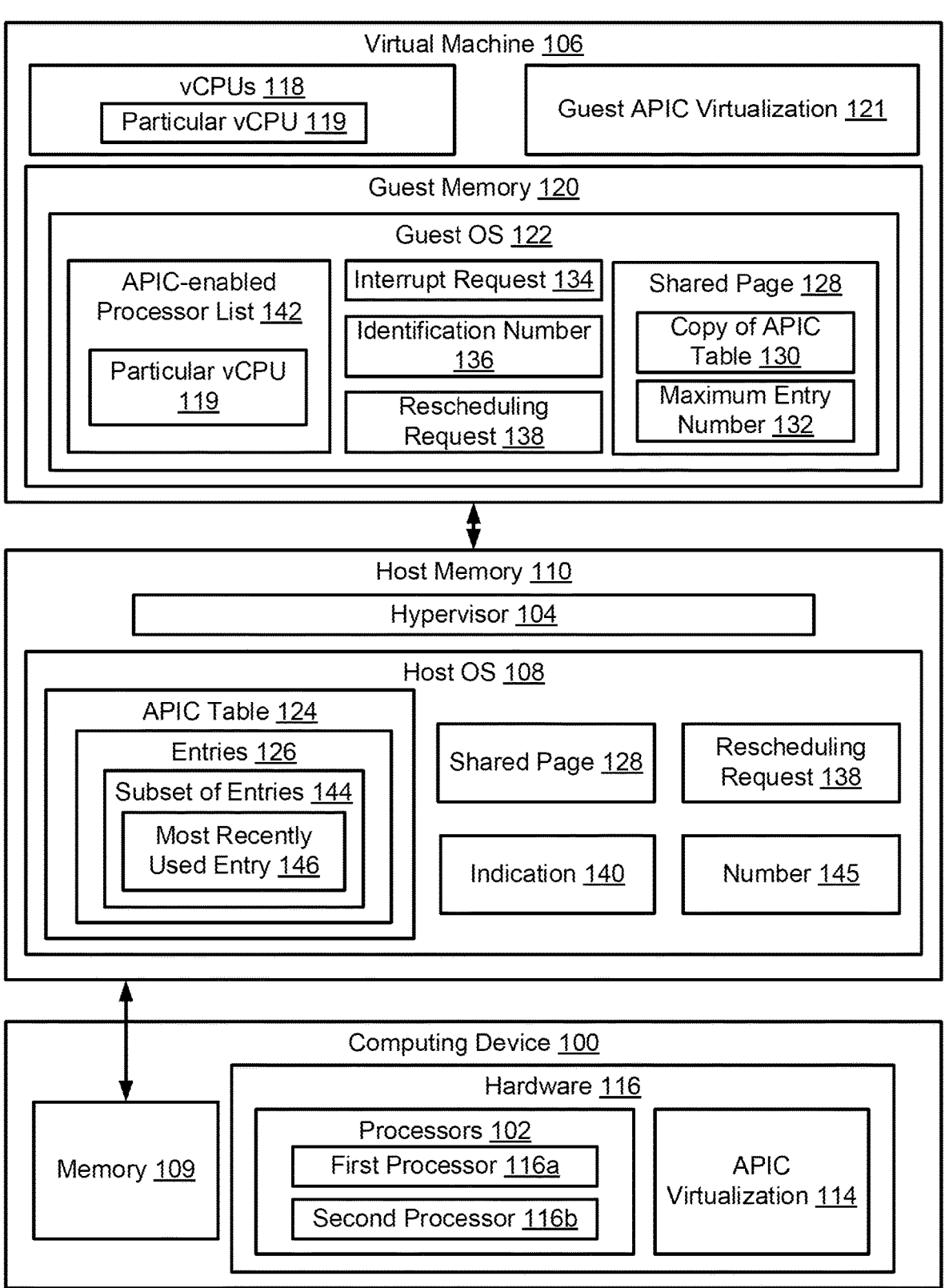
FIG. 1 is a block diagram of an example of a computing device that dynamically enables advanced programmable interrupt controller (APIC) virtualization capabilities for virtual machines (VMs) according to one aspect of the present disclosure.

A physical computer system can include one or more physical processor running a hypervisor to manage a virtual machine (VM). The VM can include guest software running in a guest context that can execute by default, allowing the hypervisor to retain control over the physical resources of the computer system. Each physical processor can include one or more processor cores that can process executable software instructions concurrently. The physical computer system can also include an interrupt controller, such as the Advanced Programmable Interrupt Controller (APIC) virtualization, which can manage interrupt requests generated by the guest software. The APIC virtualization can improve performance of the computer system by avoiding VM exits (e.g., a transition from the virtual machine context to a hypervisor context). Instead, the APIC virtualization can map virtual central processing units (vCPUs) assigned to the VM to APIC-enabled processors in an APIC table. This can allow the computer system to direct interrupt requests directly to the associated APIC-enabled processor without triggering a VM exit, which can consume significant time and computing resources. But, hardware support for the APIC virtualization typically provides limited number of mapping entries. For example, the configuration register or model specific register (MSR) that configures the mapping may provide 8 bits for the physical APIC ID of the target host processor. This can limit the number of unique mapping entries to 255−1=254. In some cases, the computer system may have more processors (e.g., CPUs, microprocessors, etc.) than number of entries in the APIC table. This can result in unpredictable and undesirable behavior if the APIC virtualization attempts to coordinate the interrupt request. Alternatively, this can result in the hypervisor completely disabling the APIC virtualization, causing all subsequent interrupt requests from the virtual machine to be handled via expensive VM exits at the cost of computing performance. Producing APIC virtualizations with higher bits (such as 12 bits) can increase the number of entries in the APIC table, but does not resolve the fundamental issue for computing systems that include more processors than entries in an APIC table.

Some examples of the present disclosure overcome one or more of the abovementioned problems by enabling the VM to dynamically utilize the APIC virtualization via a paravirtual feature known as a cooperative APIC (CAPIC) virtualization. The hypervisor can represent the CAPIC virtualization via a vCPU ID bit that can be detected by the VM. Additionally, the hypervisor can maintain a shared page between the host computer system and the VM. The shared page can include a copy of the APIC table (e.g., the current vCPU to CPU mapping). The shared page can also include a maximum entry number for the APIC table (e.g., 254 for an 8-bit APIC virtualization). The VM can access the shared page to determine if the APIC virtualization can be used to coordinate an interrupt request for a particular vCPU. If the entry for the vCPU in the copy of the APIC table is mapped to an APIC-enabled CPU, so the interrupt request will be handled using the APIC virtualization without triggering a VM exit. If the vCPU is not mapped to an APIC-enabled CPU, the VM may transmit a request to the hypervisor for a reschedule of the vCPU via a vmcall. By selectively taking advantage of APIC capabilities, time and computing resources can be conserved and unpredictable behavior can be avoided. And, security risks are avoided by exposing only the copy of the APIC table to the VM, rather than the APIC table.

In one particular example, during bootup of a host computer system, a hypervisor can detect that a maximum host APIC ID (e.g., the number of processors) exceeds what an APIC virtualization can support. The hypervisor can set a vCPU ID bit that can be detected by a VM running on the computer system. The hypervisor can also maintain a shared page between itself and the VM that reflects a copy of the current mapping between vCPUs for the VM and CPUs (e.g., the APIC table) for the computer system. The copy of the APIC table is stored in the shared page even though the APIC table already stores the mapping, because the APIC table cannot be exposed directly to the VM and is not supported by hardware. The hypervisor can also store the maximum host APIC ID supported by the APIC virtualization in the shared page. In other words, the hypervisor can store the maximum number of entries in the APIC table in the shared page.

APIC virtualization may be enabled for the VM via the vCPU ID bit. Because the VM has detected the vCPU ID bit and is aware of the APIC virtualization, the VM may determine that an upcoming interrupt for a particular vCPU may impact computing performance due to a VM exit. To prevent the VM exit, the VM can then access the shared page to identify the CPU associated with the particular vCPU. If the APIC ID for the CPU is less than the maximum host APIC ID stored in the shared page (e.g., the APIC virtualization can support coordinating the interrupt), APIC virtualization can be used for the interrupt request. For example, the APIC virtualization can coordinate an interrupt procedure for the interrupt request by injecting the interrupt for the particular vCPU directly to the CPU. This can avoid a VM exit, reducing the overhead associated with handling the interrupt.

If the APIC ID for the CPU is greater than the maximum host APIC ID (e.g., the APIC virtualization cannot support coordinating the interrupt), the VM can attempt to reschedule the interrupt request onto a different CPU that is supported by the APIC virtualization. The VM can do so by performing a vmcall( ) requesting to reschedule itself, which can be received by the hypervisor. In response, the hypervisor can call schedule( ) and can schedule the vCPU thread for the interrupt request on another CPU that has an APIC ID that can be represented by APIC virtualization. In other words, the other CPU can be stored in the APIC table because the other CPU has an APIC ID that is less than the maximum host APIC ID. The APIC virtualization can then be enabled, and the other CPU can then handle the interrupt request without triggering a VM exit. If the hypervisor cannot reschedule the vCPU to a CPU that is supported by the APIC virtualization, the APIC virtualization may not be used to perform the interrupt procedure. The interrupt procedure can then be performed via a VM exit.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing device 100 that dynamically enables advanced programmable interrupt controller (APIC) virtualization capabilities for virtual machines (VMs) according to one aspect of the present disclosure. The computing device 100 includes memory 109 and one or more processors 102, which can execute a hypervisor 104 configured to manage one or more virtual machines, such as VM 106. In some examples, the hypervisor 104 can run directly on the processors 102 without an operating system beneath it. In other examples, the hypervisor 104 can run on top of a host operating system (OS) 108 in host memory 110. The host OS can execute on the processors 102. The computing device 100 may include additional hardware 112 such as an APIC virtualization 114. The APIC virtualization 114 can be used to coordinate injection of interrupt requests from the VM 106 directly to particular processors 116.

The hypervisor 104 can be used to deploy the VM 106. The VM 106 can provide a virtualized computing environment that includes virtualized hardware configured to emulate corresponding physical hardware. Examples of the virtualized hardware can include one or more virtual central processing units (vCPUs) 118, a guest APIC virtualization 121, one or more virtual memory devices such as guest memory 120, and one or more virtual storage devices. The VM 106 can execute guest software, such as the guest OS 122, which can be any suitable type of software. Other examples of the guest software can include a guest supervisory program or a guest application. A guest application may execute in userspace and may have fewer privileges than a guest supervisory program or a guest operating system.

In some examples, the guest software can trigger interrupt requests. Some interrupt requests may impact performance, such as waitqueue operations that require inter-processor interrupts (IPIs) or device driver workqueues to handle data. For example, such interrupts may involve VM exits to the hypervisor. Such VM exits can be avoided using the APIC virtualization 114, which keeps a mapping of vCPUs 118 to their corresponding APIC-enabled processors 102 as entries 126 in an APIC table 124. When an interrupt request 134 is generated by the VM 106, the APIC virtualization 114 can coordinate transmission of the interrupt directly to the first processor 116a mapped to the particular vCPU 119 in the APIC table 124. But, there may be more processors 102 than entries 126 in the APIC table 124. So, the APIC virtualization 114 may be dynamically utilized by the VM 106 to flexibly handle interrupt requests 134.

The hypervisor 104 may expose the APIC virtualization 114 to the VM 106 via a shared page 128, which can be accessed by both the hypervisor 104 and the VM 106. The shared page 128 can include a copy of the APIC table 130, which can be updated by the hypervisor 104 in response to changes to the APIC table 124. The shared page 128 can also include a maximum entry number 132 for the APIC table 124. For example, if the APIC virtualization 114 has 8 bits, the maximum entry number 132 can be 254. If the APIC virtualization 114 has 12 bits, the maximum entry number 132 can be 4094.

When the VM 106 generates an interrupt request 134, the VM 106 can determine if the interrupt will involve a VM exit to the hypervisor 104. For example, an IPI can involve one processor (e.g., a first vCPU for the VM 106) interrupting another processor (e.g., a second vCPU for the VM 106). In some cases, a context switch from the VM 106 to the hypervisor 104 in a VM exit may be used to determine which processors 102 are associated with the first vCPU and second vCPU. To avoid the VM exit, the VM 106 can access the shared page 128 to identify a first processor 116a associated with a particular vCPU 119 involved in the interrupt request 134. The first processor 116a will have an identification number 136. If the identification number 136 is less than the maximum entry number 132, the APIC virtualization 114 can be used to handle the interrupt request 134 without issue. Thus, the APIC virtualization 114 can be used to inject the interrupt request 134 directly to the first processor 116a to perform an interrupt procedure. And, the interrupt procedure may not involve a VM exit.

In other examples, if the identification number 136 for the first processor 116a is greater than the maximum entry number 132, this can indicate that APIC virtualization 114 may not successfully performed. For example, the APIC virtualization 114 may have 8 bits and 254 entries in the APIC table 124, and the first processor 116a may have an identification number 136 of 270. If the APIC virtualization 114 were to coordinate the interrupt request 134, unpredictable behavior may result that may negatively impact computing performance. But, the VM 106 may attempt to reschedule the particular vCPU 119 to a second processor 116b that has an identification number 136 that is less than the maximum entry number 132 (e.g., is APIC-enabled).

For example, the VM 106 can transmit a rescheduling request 138 to the hypervisor 104. The hypervisor 104 can receive the rescheduling request 138 and can attempt to reschedule the interrupt request 134 to an APIC-enabled processor. If there are no available processors 102 with identification numbers 136 that are lower than the maximum entry number 132, the interrupt request 134 can be fulfilled via a VM exit. In other examples, the hypervisor 104 may identify a second processor 116b that has an identification number 136 that is lower than the maximum entry number 132, such as 120. Thus, the second processor 116b is APIC-enabled. The hypervisor 104 can reschedule the interrupt request 134 by mapping the second processor 116b to the particular vCPU 119 in the APIC table 124. Additionally, the hypervisor 104 can enable the APIC virtualization 114 to execute the interrupt procedure for the interrupt request 134. The interrupt can therefore be injected directly to the second processor 116b without a VM exit. The hypervisor 104 can update the APIC table 124 as well as the copy of the APIC table 130 in the shared page 128.

To reduce latency for subsequent interrupt requests 134, the hypervisor 104 can maintain an internal data structure that stores an indication 140 that the particular vCPU 119 requires a processor 102 that can be supported by the APIC virtualization 114. The VM 106 can also update an APIC-enabled processor list 142 to include the particular vCPU 119 associated with the interrupt request 134 that got rescheduled. The VM 106 can proactively migrate subsequent interrupt requests 134 to vCPUs listed in the APIC-enabled processor list 142. Thus, rescheduling requests 138 (which may or may not succeed) can be avoided, reducing latency for the computing device 100.

In some examples, the hypervisor 104 may reserve a limited number of entries 126 for the VM 106 in the APIC table 124. For example, the hypervisor 104 may manage multiple VMs that each require processors 102 mapped to vCPUs 118. The hypervisor 104 may reserve subset of entries 144 in the APIC table 124 to allocate to VM 106. But in some examples the VM 106 may use each entry the subset of entries 144 by transmitting large numbers of rescheduling requests 138. Therefore, the hypervisor 104 may determine that a number 145 of rescheduling requests 138 transmitted from the VM 106 exceeds a number of the subset of entries 144. In response, the hypervisor 104 can overwrite a least recently used entry 146 in the subset of entries 144 with the rescheduled mapping (e.g., the mapping of the second processor 116b to the particular vCPU 119).

Although FIG. 1 depicts a certain number and arrangement of components, this is for illustrative purposes and intended to be non-limiting. Other examples may include more components, fewer components, different components, or a different arrangement of the components shown in FIG. 1.

Figure 2:
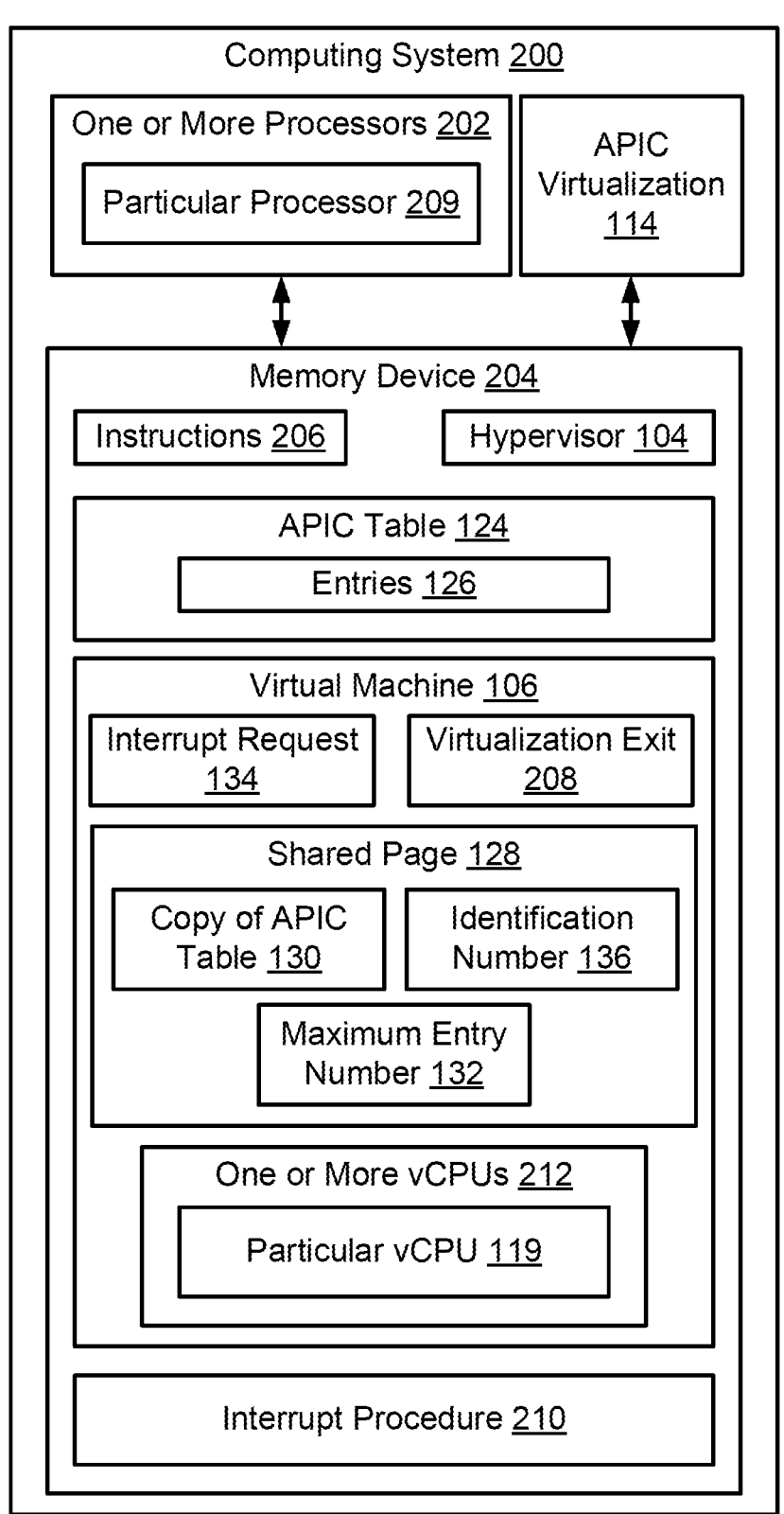
FIG. 2 is a block diagram of a computing device that dynamically enables APIC virtualization capabilities for VMs according to one aspect of the present disclosure.

FIG. 2 is a block diagram of a computing system that dynamically enables APIC virtualization capabilities for VMs according to one aspect of the present disclosure. The computing system 200 includes one or more processors 202 and an APIC virtualization 114 communicatively coupled to a memory 204. The one or more processors 202, APIC virtualization 114, and memory 204 are hardware that can be integrated into a single computing device or can be distributed from one another.

The one or more processors 202 can include one processing device or multiple processing devices. Non-limiting examples of the one or more processors 202 include a Field-Programmable Gate Array (FPGA), an application-specific integrated circuit (ASIC), a microprocessor, etc. The one or more processors 202 can execute instructions 206 stored in the memory 204 to perform the operations. In some examples, the instructions 206 can include processor-specific instructions generated by a compiler or an interpreter from code written in any suitable computer-programming language, such as C, C++, C#, etc.

Memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the one or more processors 202 can read instructions 206. A computer-readable medium can include electronic, optical, magnetic, or other storage devices capable of providing the one or more processors 202 with computer-readable instructions 206 or other program code. Examples of a computer-readable medium can include magnetic disks, memory chips, ROM, random-access memory RAM, an ASIC, a configured processor, optical storage, or any other medium from which a computer processor can read instructions 206.

The one or more processors 202 can execute instructions 206 to dynamically utilize the APIC virtualization 114 as needed for interrupt requests 134 generated by a VM 106 executing on the computing system 200. For example, the one or more processors 202 can execute the VM 106 to determine that an upcoming interrupt request 134 executed by a particular vCPU 119 allocated to the VM 106 will involve a virtualization exit 208. The one or more processors 202 for the computing system 200 can be mapped to the one or more vCPUs 212 allocated to the VM in entries 126 in an APIC table 124 for the APIC virtualization 114. In response to determining that the upcoming interrupt request 134 will involve the virtualization exit 208, the one or more processors 202 can execute the VM 106 to access a shared page 128 comprising a copy of the APIC table 130 and a maximum entry number 132 for the APIC table 124. The one or more processors 202 can execute the VM 106 to determine that an identification number 136 of a particular processor 209 mapped to the particular vCPU 119 in the copy of the APIC table 130 is less than the maximum entry number 132. In response, the one or more processors 202 can execute an interrupt procedure 210 for the interrupt request 134 using the APIC virtualization 114 without triggering the virtualization exit 208.

FIG. 3 is a flowchart of a process for dynamically enabling APIC virtualization capabilities for VMs according to one aspect of the present disclosure. Other examples may include more operations, fewer operations, different operations, or a different order of operations than is shown in FIG.

3. The operations of FIG. 3 are described below with reference to the components of FIGS. 1-2 described above.

At block 302, the one or more processors 202 can determine that an upcoming interrupt request 134 executed by a particular vCPU 119 allocated to the VM 106 will involve a virtualization exit 208. The one or more processors 202 are mapped to one or more vCPUs 212 allocated to the VM 106 in entries 126 in an APIC table 124 for an APIC virtualization 114. The interrupt request 134 may involve interrupting the particular vCPU 119 to ensure that an operation assigned to the particular vCPU 119 has been performed.

At block 304, in response to determining that the upcoming interrupt request 134 will involve the virtualization exit 208, the one or more processors 202 can access a shared page 128 comprising the copy of the APIC table 130 and a maximum entry number 132 for the APIC table 124. Each of the one or more vCPUs 212 may be mapped to one or more processors 202 for the computing system 200 in an APIC table 124. The mappings can also be stored in the copy of the APIC table 130 shared with the VM 106. For example, the copy of the APIC table 130 may include a mapping between a particular processor 209 and the particular vCPU 119.

At block 306, the one or more processors 202 can determine that an identification number 136 of the particular processor 209 mapped to the particular vCPU 119 in the copy of the APIC table 130 is less than the maximum entry number 132. This may indicate that the particular processor 209 is APIC-enabled, and that the interrupt request 134 may be fulfilled without a virtualization exit 208. But, if the identification number 136 is greater than the maximum entry number 132, this may indicate that all entries 126 in the APIC table 130 are in use. This may also indicate that all other processors not listed in the APIC table may not be APIC-enabled. In such examples, the VM 106 may transmit a rescheduling request 138 to the hypervisor 104 to reschedule the interrupt request 134 to an APIC-enabled processor (e.g., a processor with an identification number 136 that is less than the maximum entry number 132).

At block 308, in response to determining that the identification number 136 of the particular processor 209 is less than the maximum entry number 132, the one or more processors 202 can execute can execute an interrupt procedure 210 for the interrupt request 134 using the APIC virtualization 114 without triggering the virtualization exit 208. For example, the one or more processors 202 can enable the APIC virtualization 114. The APIC virtualization 114 may then coordinate the interrupt procedure 210 by injecting the interrupt directly to the particular processor 209. In this way, the VM 106 can determine, via the particular processor 209, if the operation associated with the interrupt request 134 has been performed.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
one or more processors; and
a non-transitory computer-readable memory comprising instructions for causing the one or more processors to:
determine, by a virtual machine, that an upcoming interrupt request executed by a particular virtual central processing unit (vCPU) allocated to the virtual machine will involve a virtualization exit, wherein the one or more processors are mapped to one or more vCPUs allocated to the virtual machine in entries in an advanced programmable interrupt controller (APIC) table for an APIC virtualization;
in response to determining that the upcoming interrupt request will involve the virtualization exit, access, by the virtual machine, a shared page comprising a copy of the APIC table and a maximum entry number for the APIC table;
determine, by the virtual machine, that an identification number of a particular processor mapped to the particular vCPU in the copy of the APIC table is less than the maximum entry number; and
in response to determining that the identification number of the particular processor is less than the maximum entry number, execute an interrupt procedure for the interrupt request using the APIC virtualization without triggering the virtualization exit.

2. The system of claim 1, wherein the non-transitory computer-readable memory is further executable by the one or more processors to:
determine, by the virtual machine, that the identification number of the particular processor mapped to the particular vCPU is greater than the maximum entry number; and
in response to determining that the identification number of the particular processor mapped to the particular vCPU is greater than the maximum entry number, transmit, by the virtual machine, a rescheduling request for the particular vCPU.

3. The system of claim 2, wherein the particular processor is a first processor, and wherein the non-transitory computer-readable memory is further executable by the one or more processors to:
receive, by a hypervisor managing the virtual machine, the rescheduling request for the particular vCPU from the virtual machine; and
in response to receiving the rescheduling request, rescheduling the interrupt request by:
identifying, by the hypervisor, a second processor of the one or more processors that is supported by the APIC virtualization;
mapping, by the hypervisor, the second processor to the particular vCPU in an entry in the APIC table; and
enabling the APIC virtualization to execute the interrupt procedure for the interrupt request using the second processor.

4. The system of claim 3, wherein the non-transitory computer-readable memory is further executable by the one or more processors to:
reserve, by the hypervisor, a subset of entries in the APIC table to allocate to the virtual machine;
determine, by the hypervisor, that a number of rescheduling requests from the virtual machine exceeds a number of the subset of entries; and
in response to determining that the number of rescheduling requests exceeds the number of the subset of entries, overwrite, by the hypervisor, a least recently used entry of the subset of entries with the mapping of the second processor to the particular vCPU.

5. The system of claim 3, wherein the non-transitory computer-readable memory is further executable by the one or more processors to:
in response to mapping the particular processor to the particular vCPU, store, by the hypervisor, an indication that the particular vCPU requires a processor that is supported by the APIC virtualization.

6. The system of claim 3, wherein the non-transitory computer-readable memory is further executable by the one or more processors to:

in response to rescheduling the interrupt request, update, by the virtual machine, an APIC-enabled processor list to include the particular vCPU associated with the upcoming interrupt request.

7. The system of claim 6, wherein the non-transitory computer-readable memory is further executable by the one or more processors to, subsequent to updating the APIC-enabled processor list:

generate, by the virtual machine, another interrupt request; and migrate the other interrupt request to a vCPU from the APIC-enabled processor list.

8. A method comprising:

determining, by a virtual machine, that an upcoming interrupt request executed by a particular virtual central processing unit (vCPU) allocated to the virtual machine will involve a virtualization exit, wherein one or more processors are mapped to one or more vCPUs allocated to the virtual machine in entries in an advanced programmable interrupt controller (APIC) table for an APIC virtualization;

in response to determining that the upcoming interrupt request will involve the virtualization exit, accessing, by the virtual machine, a shared page comprising a copy of the APIC table and a maximum entry number for the APIC table;

determining, by the virtual machine, that an identification number of a particular processor mapped to the particular vCPU in the copy of the APIC table is less than the maximum entry number; and in response to determining that the identification number of the particular processor is less than the maximum entry number, executing, by the one or more processors, an interrupt procedure for the interrupt request using the APIC virtualization without triggering the virtualization exit.

9. The method of claim 8, further comprising:

determining, by the virtual machine, that the identification number of the particular processor mapped to the particular vCPU is greater than the maximum entry number; and in response to determining that the identification number of the particular processor mapped to the particular vCPU is greater than the maximum entry number, transmitting, by the virtual machine, a rescheduling request for the particular vCPU.

10. The method of claim 9, wherein the particular processor is a first processor, and wherein the method further comprises:

receiving, by a hypervisor managing the virtual machine, the rescheduling request for the particular vCPU from the virtual machine; and in response to receiving the rescheduling request, rescheduling the interrupt request by:

identifying, by the hypervisor, a second processor of the one or more processors that is supported by the APIC virtualization;

mapping, by the hypervisor, the second processor to the particular vCPU in an entry in the APIC table; and enabling the APIC virtualization to execute the interrupt procedure for the interrupt request using the second processor.

11. The method of claim 10, further comprising:

reserving, by the hypervisor, a subset of entries in the APIC table to allocate to the virtual machine;

determining, by the hypervisor, that a number of rescheduling requests from the virtual machine exceeds a number of the subset of entries; and in response to determining that the number of rescheduling requests exceeds the number of the subset of entries, overwriting, by the hypervisor, a least recently used entry of the subset of entries with the mapping of the second processor to the particular vCPU.

12. The method of claim 10, further comprising:

in response to mapping the particular processor to the particular vCPU, storing, by the hypervisor, an indication that the particular vCPU requires a processor that is supported by the APIC virtualization.

13. The method of claim 10, further comprising:

in response to rescheduling the interrupt request, updating, by the virtual machine, an APIC-enabled processor list to include the particular vCPU associated with the upcoming interrupt request.

14. The method of claim 13, further comprising, subsequent to updating the APIC-enabled processor list:

generating, by the virtual machine, another interrupt request; and migrating the other interrupt request to a vCPU from the APIC-enabled processor list.

15. A non-transitory computer-readable medium comprising program code that is executable by one or more processors for causing the one or more processors to:

determine, by a virtual machine, that an upcoming interrupt request executed by a particular virtual central processing unit (vCPU) allocated to the virtual machine will involve a virtualization exit, wherein the one or more processors are mapped to one or more vCPUs allocated to the virtual machine in entries in an advanced programmable interrupt controller (APIC) table for an APIC virtualization;

in response to determining that the upcoming interrupt request will involve the virtualization exit, access, by the virtual machine, a shared page comprising a copy of the APIC table and a maximum entry number for the APIC table;

determine, by the virtual machine, that an identification number of a particular processor mapped to the particular vCPU in the copy of the APIC table is less than the maximum entry number; and in response to determining that the identification number of the particular processor is less than the maximum entry number, execute an interrupt procedure for the interrupt request using the APIC virtualization without triggering the virtualization exit.

16. The non-transitory computer-readable medium of claim 15, wherein the program code is further executable by the one or more processors for causing the one or more processors to:

determine, by the virtual machine, that the identification number of the particular processor mapped to the particular vCPU is greater than the maximum entry number; and in response to determining that the identification number of the particular processor mapped to the particular vCPU is greater than the maximum entry number, transmit, by the virtual machine, a rescheduling request for the particular vCPU.

17. The non-transitory computer-readable medium of claim 16, wherein the program code is further executable by the one or more processors for causing the one or more processors to:

receive, by a hypervisor managing the virtual machine, the rescheduling request for the particular vCPU from the virtual machine; and in response to receiving the rescheduling request, rescheduling the interrupt request by:

identifying, by the hypervisor, a second processor of the one or more processors that is supported by the APIC virtualization; and mapping, by the hypervisor, the second processor to the particular vCPU in an entry in the APIC table; and enabling the APIC virtualization to execute the interrupt procedure for the interrupt request using the second processor.

18. The non-transitory computer-readable medium of claim 17, wherein the program code is further executable by the one or more processors for causing the one or more processors to:

reserve, by the hypervisor, a subset of entries in the APIC table to allocate to the virtual machine;

determine, by the hypervisor, that a number of rescheduling requests from the virtual machine exceeds a number of the subset of entries; and in response to determining that the number of rescheduling requests exceeds the number of the subset of entries, overwrite, by the hypervisor, a least recently used entry of the subset of entries with the mapping of the second processor to the particular vCPU.

19. The non-transitory computer-readable medium of claim 17, wherein the program code is further executable by the one or more processors for causing the one or more processors to:

in response to mapping the particular processor to the particular vCPU, store, by the hypervisor, an indication that the particular vCPU requires a processor that is supported by the APIC virtualization.

20. The non-transitory computer-readable medium of claim 19, wherein the program code is further executable by the one or more processors for causing the one or more processors to:

in response to rescheduling the interrupt request, update, by the virtual machine, an APIC-enabled processor list to include the particular vCPU associated with the upcoming interrupt request.

* * * * *